United States Patent
Frost et al.

(10) Patent No.: US 7,222,001 B2
(45) Date of Patent: May 22, 2007

(54) SYSTEM FOR MONITORING AND CONTROLLING FUEL CELL-BASED POWER GENERATION UNITS

(75) Inventors: Gordon Scott Frost, Wilton, NY (US); Michael T. DiPasquale, Troy, NY (US); John W. Parks, Loudonville, NY (US)

(73) Assignee: Plug Power Inc., Latham, NY (US)

( * ) Notice: Subject to any disclaimer, the term of this patent is extended or adjusted under 35 U.S.C. 154(b) by 542 days.

(21) Appl. No.: 10/145,828

(22) Filed: May 14, 2002

(65) Prior Publication Data

US 2003/0215677 A1 Nov. 20, 2003

(51) Int. Cl.
*G05D 3/12* (2006.01)

(52) U.S. Cl. .................................... 700/286; 429/23

(58) Field of Classification Search ................ 700/19, 700/22, 286, 287; 429/13, 22, 23
See application file for complete search history.

(56) References Cited

U.S. PATENT DOCUMENTS

| | | | | |
|---|---|---|---|---|
| 4,080,487 A | * | 3/1978 | Reiser | 429/16 |
| 5,141,824 A | * | 8/1992 | Hirota | 429/23 |
| 5,939,218 A | * | 8/1999 | Mizuno | 429/23 |
| 6,296,957 B1 | * | 10/2001 | Graage | 429/12 |
| 6,503,649 B1 | * | 1/2003 | Czajkowski et al. | 429/23 |
| 6,522,955 B1 | * | 2/2003 | Colborn | 700/286 |
| 6,589,682 B1 | * | 7/2003 | Fleckner et al. | 429/34 |
| 6,697,951 B1 | * | 2/2004 | Sinha et al. | 713/300 |
| 6,757,590 B2 | * | 6/2004 | Ross et al. | 700/286 |
| 6,833,205 B2 | * | 12/2004 | Speranza et al. | 429/13 |
| 6,835,481 B2 | * | 12/2004 | Dickman et al. | 429/19 |
| 6,850,820 B2 | * | 2/2005 | Tajima | 700/286 |
| 6,898,488 B2 | * | 5/2005 | Kusaka et al. | 700/286 |
| 6,912,889 B2 | * | 7/2005 | Staphanos et al. | 73/23.31 |
| 6,944,555 B2 | * | 9/2005 | Blackett et al. | 702/62 |
| 2001/0056315 A1 | * | 12/2001 | Nagafuchi et al. | 700/286 |

\* cited by examiner

*Primary Examiner*—Albert W. Paladini
(74) *Attorney, Agent, or Firm*—Trop, Pruner & Hu, P.C.

(57) ABSTRACT

A system includes fuel cell units and an on-site computer that is located near the units. The on-site computer is coupled to the fuel cell subsystems to communicate indications of operating conditions of the fuel cell subsystems over a remote communication link to a remote computer.

29 Claims, 6 Drawing Sheets

| TIME | | POWER SETTING | GROUPS |
|---|---|---|---|
| 0:00 | $T_0$ | $P_1$ | 1,2,3 |
| 4:00 | $T_1$ | $P_2$ | 1,2 |
| 5:00 | $T_2$ | $P_3$ | 1,2 |
| 6:00 | $T_3$ | $P_1$ | 1,2 |
| 14:00 | $T_4$ | $P_3$ | 3 |
| 16:00 | $T_5$ | $P_1$ | 1,2 |

SYSTEM FOR MONITORING AND CONTROLLING FUEL CELL-BASED POWER GENERATION UNITS

BACKGROUND

The invention generally relates to a system for monitoring and controlling fuel cell-based power generation units.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

$$H_2 \rightarrow 2H^+ + 2e^-$$

at the anode of the cell, and

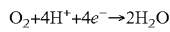

$$O_2 + 4H^+ + 4e^- \rightarrow 2H_2O$$

at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

A fuel cell system may be formed out of a fuel cell stack and various subsystems needed to produce reactant flows through the stack, cool the stack, monitor the operation of the stack, etc. Several of the fuel cell systems may be used to collectively provide power to a load. For example, the output terminals of the fuel cell systems may be connected in parallel to furnish power to a power grid. Even with this parallel arrangement, the operation of each system may be independently controlled and monitored.

SUMMARY

In an embodiment of the invention, a system includes fuel cell-based power generation units and an on-site computer that is located near the units. The on-site computer is coupled to the units to communicate operating conditions of the units over a communication link to a remote computer.

Advantages and other features of the invention will become apparent from the following description, drawing and claims.

DETAILED DESCRIPTION

Figure 1:
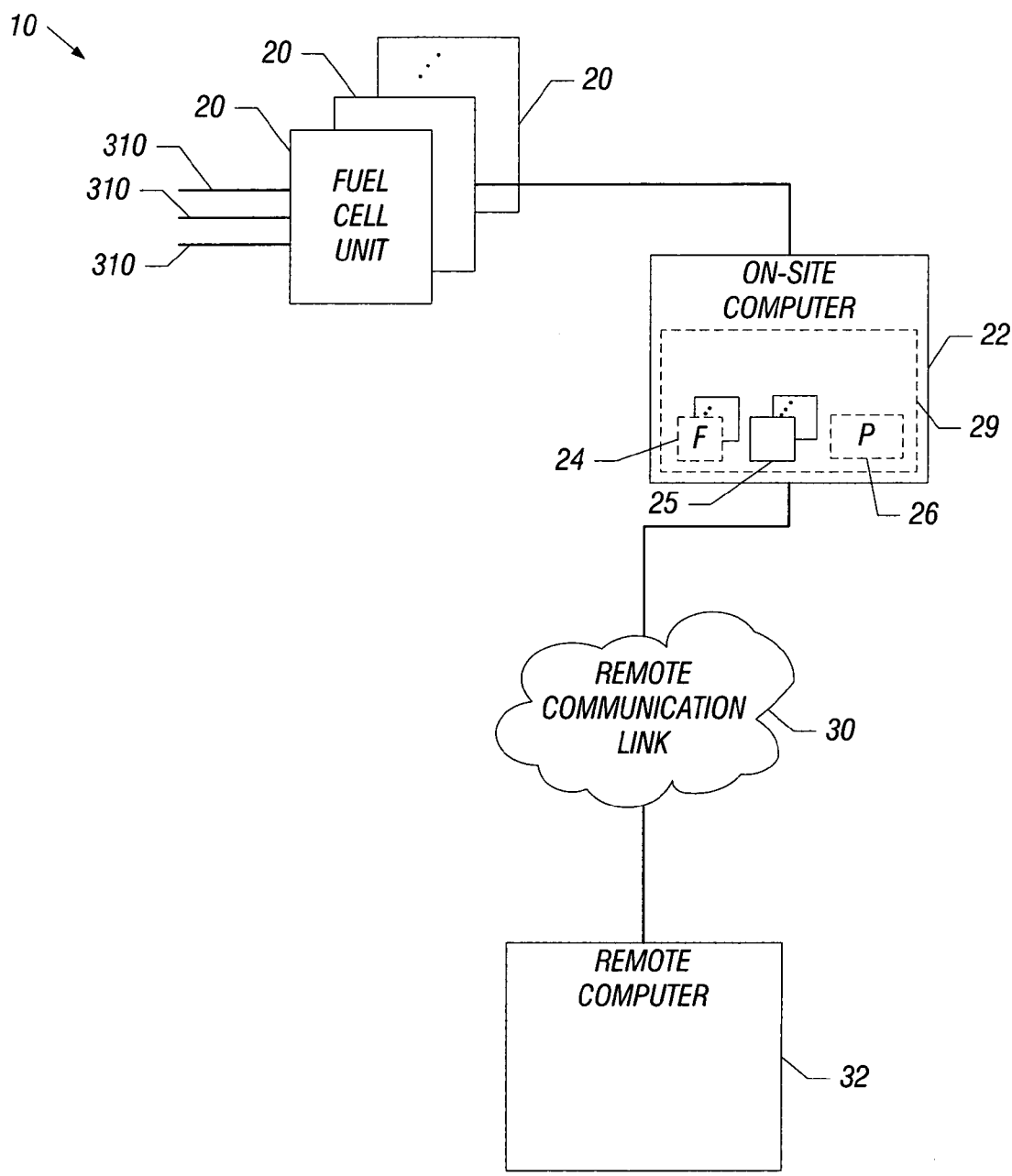
FIG. 1 is a schematic diagram of a fuel cell-based power generation system.

Referring to FIG. 1, a fuel cell-based power generation system according to an embodiment of the invention includes several fuel cell-based power generation units 20 that each provide output power to their respective output terminals 310. Each unit 20 is a fuel cell system having a fuel cell stack and the associated subsystems to control operation of the stack and conditioning of the power that is provided by the unit 20. The output terminals 310 of the units 20 are coupled together in parallel for purposes of providing power to a load (a power grid and associated loads, for example). The units 20 are also coupled to an on-site computer 22 that is located near the units 20 to perform various functions relating to the monitoring and control of the units 20, as described below.

As an example, in some embodiments of the invention, the on-site computer 22 communicates with the units 20 to retrieve data regarding various operating parameters of the units 20. As an example, for a particular unit 20, this data may indicate voltages, currents, flow rates, set points, temperatures and efficiencies related to various parameters that characterize operation of the unit 20. Based on this information from these various parameters, the on-site computer 22 then may be used to control, as described below, the operation of each unit 20, either individually or by the association of the unit 20 with a particular group of the units 20.

In some embodiments of the invention, the on-site computer 22 logs the monitored parameters for each unit 20 by storing (on its local mass storage device 29 (a hard disk drive, for example), for example) corresponding data in a log file 24. The file 24 is associated with the unit 20 and contains data logged by the on-site computer 22 for that unit 20. In this manner, the computer 22 maintains a log file 24 for each unit 20. At predetermined time intervals (as set by a user-defined sampling frequency, for example), the on-site computer 22 retrieves data that indicates sampled operating parameters for the units 20 and stores the data in the corresponding files 24.

Associated with the function of retrieving the operating parameters from the units 20, the on-site computer 22 monitors the parameters to determine whether an error has occurred in the operation of one of the units 20. In this manner, should an error occur, the on-site computer 22 logs both the error and the conditions associated with the error in an error file 25. As an example, in some embodiments of the invention, the on-site computer 22 may maintain (in its local mass storage device 29) an error file 25 for each unit 20. Therefore, should a particular unit 20 malfunction, the corresponding error file 25 may be examined (by a user of the on-site computer 22, for example) to determine the cause of the malfunction.

In some embodiments of the invention, the units 20 may be independently controlled (relative to each other) or may be controlled as a part of a group. Thus, for the latter case, the units 20 are organized into groups, with each group of units 20 responding to the same control command. As an example, the on-site computer 22 may be instructed (by a user of the computer 22, for example) to turn up or down the power level for a particular unit 20 or group independently from the control of the other units 20 (or groups). Furthermore, the on-site computer 22 may independently shut down or power up a particular unit 20 or group of units 20.

For purposes of centralizing the control of the units 20, along with other such units 20 (not shown in FIG. 1) that are located at other sites, data from the on-site computer 22 may be communicated through a remote communication link 30 to a remote computer 32. In this manner, the remote computer 32 is not located at the same site as the on-site computer 22 and the units 20 that are depicted in FIG. 1. For example, in some embodiments of the invention, the remote computer 32 may be located one mile or more away from the fuel cell units 20. Thus, in the context of this application, the terms "local," "on-site" and "near" are used in connection with determining the distance between entities that are located within one mile of each other, and terms, such as "remote" (for example), are used in connection with defining the distance between entities that are located one mile or more from each other. As examples, the remote communication link 30 may be an Ethernet link, a satellite-based link, a T1-based link, a wide area network (WAN) link, a wireless radio signal-based link, a cellular-based link or other types of remote communication links.

The remote computer 32, in some embodiments of the invention, continually receives a limited subset of the data that is stored in the files 24 for purposes of receiving indications of a limited subset of the parameters that are monitored by the on-site computer 22. In this manner, by limiting the amount of data that is communicated over the remote communication link 30 to only a subset of the logged data that is obtained by the on-site computer 22, bandwidth is conserved, thereby allowing a "real-time" indication of the performance of each unit 20 to be displayed on the remote computer 32.

Not only may the remote computer 32 monitor specific conditions of the units 20, the remote computer 32 may also, in some embodiments of the invention, communicate commands to the on-site computer 22 for purposes of remotely controlling operations of the units 20. For example, depending on the particular embodiment of the invention, the remote computer 32 may (via the remote communication link 30 and computer 22) change the power level of a particular unit 20 or group of units 20; schedule loads of a particular unit 20 or group of units 20; enable or disable the remote off-site control of a particular unit 20 or group of units; or shut down a particular unit 20 or group of units 20.

Figure 2:
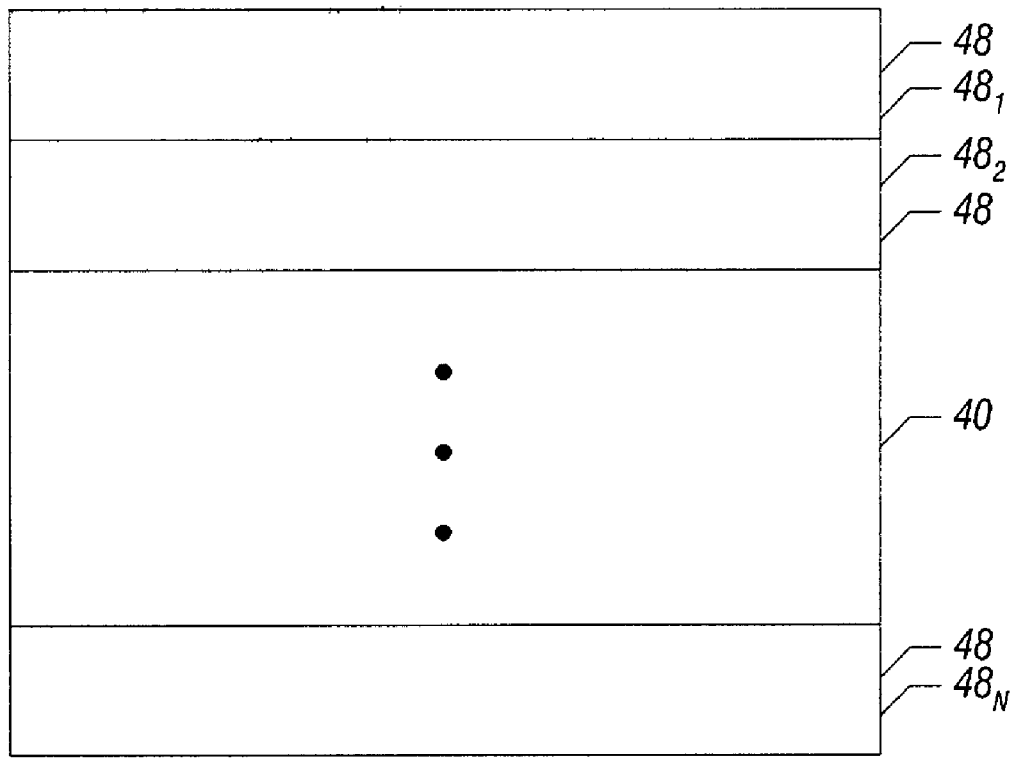
FIG. 2 is an illustration of a screen of a computer of the system of FIG. 1 according to an embodiment of the invention.
Figure 3:
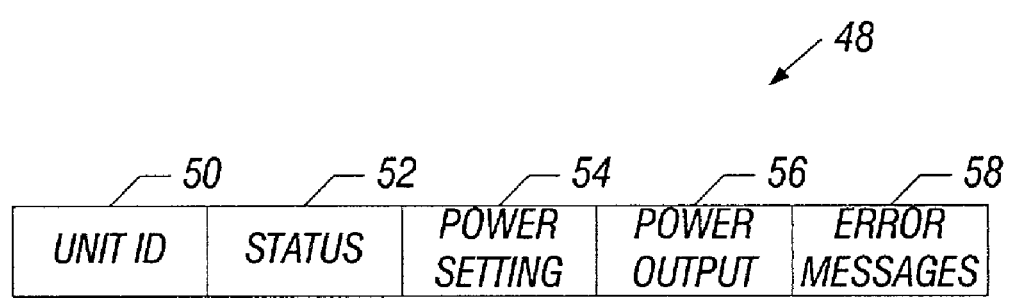
FIG. 3 is an illustration of data displayed on the screen of the computer of FIG. 2 according to an embodiment of the invention.

Referring to FIGS. 2 and 3, in some embodiments of the invention, a display 40 of the remote computer 32 may be configured to display some of the parameters that are monitored by the on-site computer 22. It is also noted that the same information may also be displayed on the on-site computer 22, although, in general, more detailed information may be displayed on the on-site computer 22, in some embodiments of the invention. As shown in FIG. 2, the display 40 is subdivided into partitions 48 (partitions $48_1$, $48_2$, ... $48_N$, depicted as examples). Each partition 48 is associated with a particular unit 20. To associate a particular unit 20 with a particular group, in some embodiments of the invention, units 20 of the same group are indicated by a common background color. For example, partitions 48 that have red backgrounds may be associated with one particular group of units 20, and partitions 48 that have blue backgrounds may be associated with units 20 of another group. Other variations are possible.

In some embodiments of the invention, a particular partition 48 may include a field 50 (FIG. 3) that indicates a unit identification. This identification may indicate the location of a particular unit 20 in the field, a serial number of the unit 20, etc. The partition 48 may also include a field 52 that indicates the status of the unit 20. For example, this status may be an indication of a system state, such as whether the unit 20 is starting up, running, shutting down, already shut down, etc. The partition 48 may also include, for example, a field 54 that indicates a power setting of the unit 20. For example, the field 54 may display the power output by the unit 20, and this display may be discretized into LOW, MEDIUM, HIGH, OFF or STANDBY states, as an example. The partition 48 may also include a field 56 that indicates the instantaneous AC power that is being output by the particular unit 20. Lastly, in some embodiments of the invention, the partition 48 may include a field 58 that indicates possible error messages that are associated with the unit 20. For example, the field 58 may display error codes so that the computer may provide contextual pull-down menus that provide text description of error codes, etc.

Figure 4:
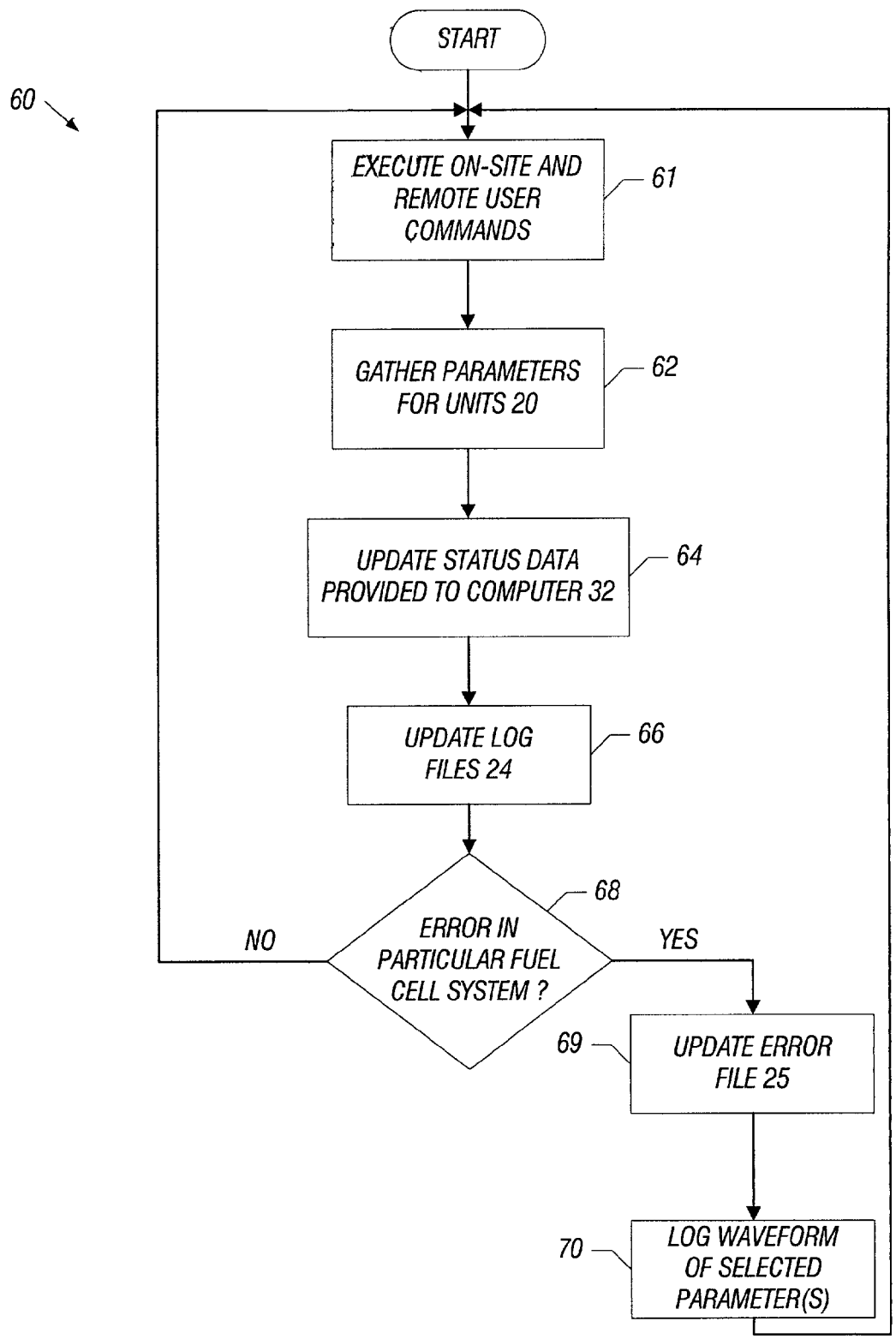
FIG. 4 is a flow diagram depicting a technique executed by an on-site computer of the system of FIG. 1 according to an embodiment of the invention.

In some embodiments of the invention, the on-site computer 22 may execute a program 26 (FIG. 1) that causes the computer 22 to perform a technique 60 that is depicted in FIG. 4. A copy of the program 26 may be stored, for example, in the mass storage 29 of the computer 22. Although the technique is depicted in FIG. 4 as a series of sequential steps, it is understood that this is merely an example. In this manner, in some embodiments of the invention, the on-site computer 22 may perform the technique 60 in a multitasking environment in which different blocks of the technique 60 are performed in different tasks, and thus, parts of the technique depicted in FIG. 4 may be effectively performed in parallel.

Referring to FIG. 4, pursuant to the technique 60, the on-site computer 22 executes (block 61) commands (called on-site commands) and commands (called remote commands) that originate at the remote computer 32. These commands may be commands relating to setting a load profile; monitoring parameters of a particular unit 20 or group of units 20; and/or commands related to controlling the operation of a particular unit 20 or group of units 20. Also in the technique 60, the on-site computer 22 gathers (block 62) parameters for the various units 20 and updates (block 64) the status data that is provided to the remote computer 32 as well as updates (block 66) the associated log files 24. If the on-site computer 22 determines (block 68) that an error has occurred in the operation of a particular unit 20, the on-site computer 22 updated (block 69) the corresponding error file 25 and logs (block 70) waveforms of selected parameters for that unit 20.

As an example of such an error, a pump in a particular unit 20 may fail or operate erratically. Therefore, in response to this condition, the on-site computer 22 may capture a waveform of a flow rate that is produced by the particular pump. This waveform capture is obtained using higher resolution sampling than the lower frequency sampling performed by the on-site computer 22 during the regular monitoring of the various parameters of the units 20. The result is a high resolution waveform that may be analyzed later by a service technician to evaluate a possible problem with the fuel cell subsystem 20. After logging (block 70) the waveform, control returns to block 61.

Figures 5, 6:
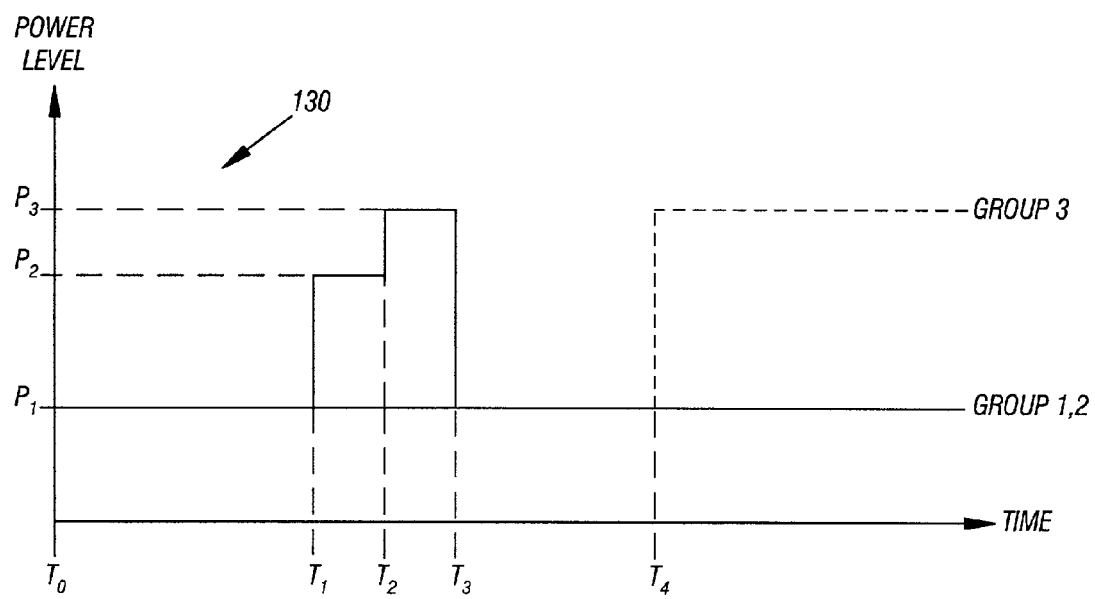
FIG. 5 is an illustration of a file for a particular load profile according to an embodiment of the invention.
FIG. 6 is a waveform depicting a power output of a particular fuel cell-based power generation unit of the system of FIG. 1 according to an embodiment of the invention.

Referring to FIG. 5, in some embodiments of the invention, the on-site computer 22 may be programmed with a load profile configuration file 120, a file that establishes a time profile for the load of one or more of the units 20. In some embodiments of the invention, the configuration file 120 controls the units 20 by groups. The programming of the on-site computer 22 with the file 120 may occur either over the remote communication link 30 (and thus, is initiated by the remote computer 32, for example) or may be introduced to the on-site computer 22 directly by a user.

As an example, in some embodiments of the invention, the configuration file 120 may be a text file that includes rows that each specify a change in power for a unit 20 or group of units 20. Each row is subdivided into three fields 120a, 120b and 120c, for example. The field 120a specifies a time for the change in the power setting, as specified by the field 120b. For this particular time and power setting, the field 120c specifies the groups of the units 20 that are affected.

Thus, for the exemplary configuration file 120 that is depicted in FIG. 5, FIG. 6 depicts the resulting power level versus time plot for the affected units 20. For the following example, three groups ("1, 2 and 3") of the units 20 are used for purposes of simplicity, although it is understood that fewer or more groups may be used. For this example, at time $T_0$, all three groups are set to the $P_1$ power level due to the settings that are indicated in row 121 of the file 120. Beginning at time $T_1$, groups 1 and 2 are raised to a higher $P_2$ power level (due to the settings indicated in row 122 of the file 120), and at time $T_2$, groups 1 and 2 are raised to an even higher $P_3$ power level (due to the settings indicated in row 123). At time $T_3$, groups 1 and 2 are restored back to the $P_1$ power level (due to the settings in row 124), and at time $T_4$, group 3 is increased to the $P_3$ power level (due to the settings in row 125). Although not depicted in FIG. 6, at time $T_5$, the groups 1 and 2 are returned to the $P_1$ power level (due to the settings in row 126).

Figure 7:
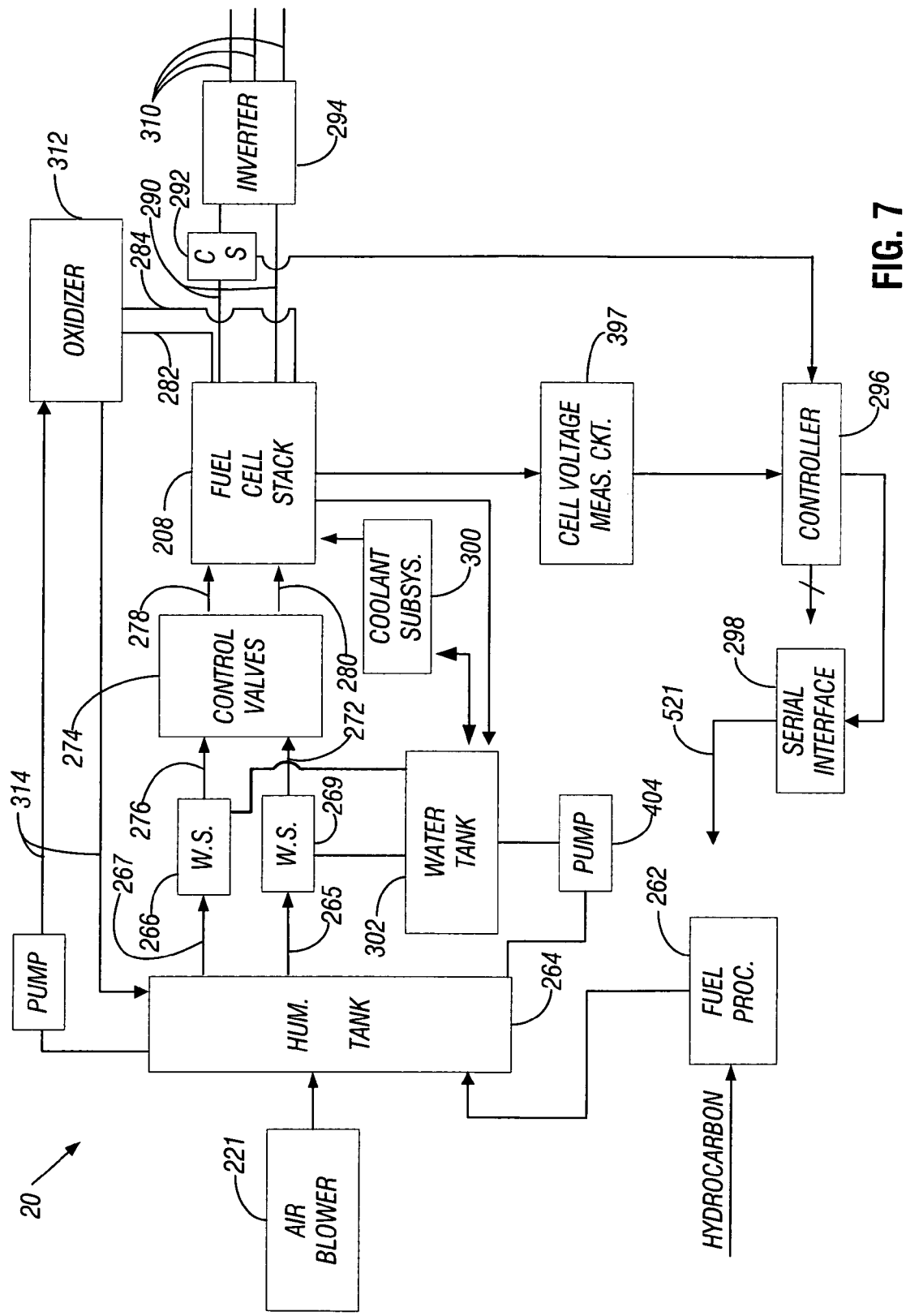
FIG. 7 is a schematic diagram of a fuel cell-based power generation unit of FIG. 1 according to an embodiment of the invention.

Referring to FIG. 7, in some embodiments of the invention, the unit 20 may form a complete fuel cell system to operate a fuel cell stack 208 and condition power that is communicated from the stack 208 to the output terminals 310 of the unit 20.

As depicted in FIG. 7, the unit 20 may include a cell voltage measuring circuit 397 that a controller 296 of the unit 20 uses to monitor the cell voltages of the stack 208. In this manner, during the normal course of operation, the controller 296 may monitor the cell voltages of the stack 208 (via the circuit 397) for purposes of regulating the production of reformate by a fuel processor 262 that produces the reformate for the stack 208. Based on these measured voltages, as well as other measured parameters of the unit 20, the controller 296 may recognize an error in the operation of the unit 20. When this occurs, the controller 296 alerts the on-site computer 22 to the error condition by furnishing the appropriate data to a serial interface 298 of the unit 20. This data is indicated in the form of a signal that appears on a serial bus 521 (an RS232 serial bus, for example) that is coupled to the on-site 22 and remote 32 computers, as described below.

Besides being used to report error conditions, the serial bus 521 establishes communication between each unit 20 and the computer 22, 32. In this manner, the controller 296 at predetermined time intervals furnishes data of the various monitored parameters of the unit 20 to the serial bus interface 298. The controller 296 also furnishes data at a higher frequency sampling (i.e., the waveform data) to the serial interface 298 when requested by the computer 22, 32. The computer 22, 32 may use the serial bus 521 to send commands to the controller 296 to change sampling rates, change a power level state of the unit 20, program the controller 296 with its associated group, power up the unit 20, power down the unit 20, change the power output of the unit 20 based on a particular load profile, etc.

Among the other components of the power generator unit 20, the unit 20 may include a humidification tank 264 that receives a fuel flow from the fuel processor 262 and receives an air flow from the air blower 221. A humidification tank 264 of the unit 20 produces steam by circulating de-ionized water through a heat source, such as an oxidizer 312, via water and steam lines 314. In this manner, a pump 404 of the of the unit 20 may be used to circulate the de-ionized water. The air and fuel flows are combined with the steam inside the tank 264 to produce humidified air and fuel flows that exit the humidification tank 264 via outlet conduits 267 and 265, respectively. The fuel cell system 20 may include water separators 266 and 269 that are coupled to the conduits 267 and 265, respectively, to remove any excess water from the humidified air and fuel flows. The outlet ports of the water separators 266 and 269 are coupled to conduits 276 and 272, respectively, that extend to control valves 274 that regulate the air and fuel flows and provide the regulated flows (via conduits 278 and 280) to the fuel cell stack 208.

The fuel cell stack 208 includes output terminals 290 that furnish a DC voltage that an inverter 294 uses to produce AC voltages on the output terminals 310 of the unit 20. In some embodiments of the invention, the controller 296 may sense the power that is demanded by the load on the unit 20 by sensing the output power from the fuel cell stack 208. To accomplish this, a current sensor 292 may be coupled in-line with one of the output terminals 290 of the fuel cell stack 208 to provide an indication of the output current of the fuel cell stack 208 to the controller 296. The controller 296 may also receive indications of the cell voltages of the fuel cell stack 208 via the cell voltage measuring circuit 397. Based on these parameters, the controller 296 may determine the output power of the fuel cell stack 208 and thus, may determine the power that is demanded by the load. The oxidizer 312 receives exhaust air and fuel flows from the stack 208 via outlet conduits 282 and 284, respectively, and oxidizes any remaining gases in these flows.

Among the other features of the unit 20, the unit 20 may include a coolant subsystem 300 that circulates a coolant through the fuel cell stack 208, such as de-ionized water, for example. In this manner, the coolant subsystem 300 may circulate de-ionized water between a water tank 302 and the fuel cell stack 208. The unit 20 may also include a pump 404 and that pumps de-ionized water, as needed, into the humidification tank 264. The water separators 266 and 269 include outlet ports that are connected to water lines to carry water from the water separators 266 and 269, respectively to the water tank 302.

Figure 8:
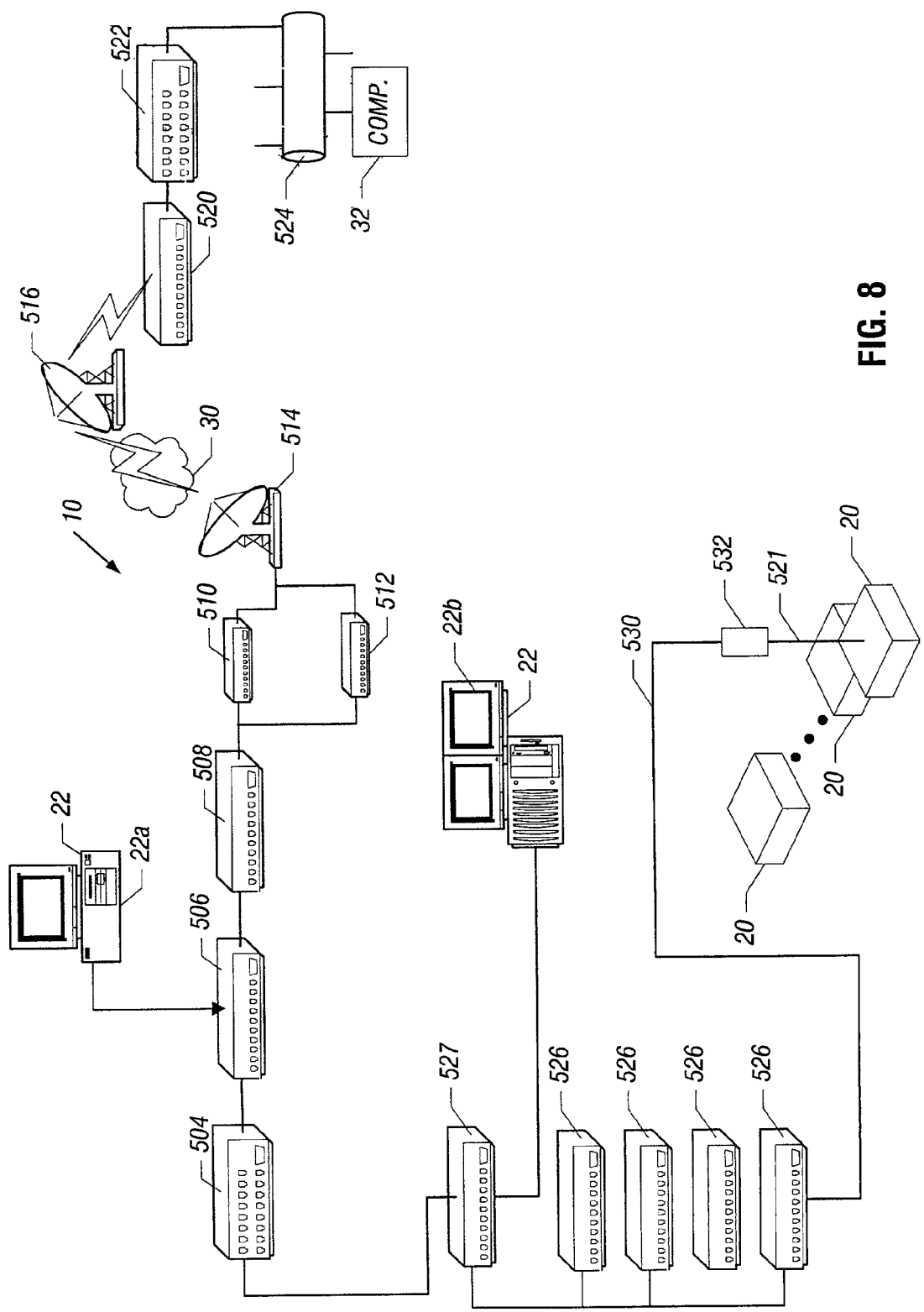
FIG. 8 is a schematic diagram of a fuel cell-based power generation system according to an embodiment of the invention.

FIG. 8 depicts a more detailed schematic diagram of the system 10, according to some embodiments of the invention. The serial interface 298 (FIG. 7) of a particular unit 20 transmits data, as indicated by generating a corresponding signal stream on the serial bus 521. An Ethernet-to-serial converter circuit 532 converts the serial signal into an Ethernet 10 Base Ten (10BT) format signal that appears on an Ethernet bus 530. The serial bus 530, in turn is coupled to a hub 526. Each additional unit 20 of the system 10 is coupled to the Ethernet network in a similar fashion. I.e., each unit 20 has its associated converter 532 and hub 526 in some embodiments of the invention.

The hubs 526 are coupled to a virtual private network (VPN) router 504 that, in turn is coupled to another hub 506. Furthermore, a hub 527 is coupled to the VPN router 504. The hubs 506 and 527 may be used to, for example, couple on-site computers 22 (on-site computers 22*a* and 22*b*, depicted as examples) to the network.

In some embodiments of the invention, the hub 506 is coupled to a satellite router 508 that, in turn, is coupled to a satellite dish 514 through a transmit modem 510 and a receive modem 512. Thus, the above-described circuitry of the system 10 constitutes the on-site equipment near the units 20.

The remote communication link 30 is formed via the satellite dish 514 and a satellite dish 516 of the remote components of the system 10. In particular, these remote components include a router 520 that is coupled to a virtual private network (VPN) router 522. The VPN router 522, in turn, is coupled to, for example, a local area network (LAN) 524. As an example, the remote computer 32 may be coupled to this LAN 524. Other variations of the system 10 are possible.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A system comprising:
   fuel cell-based power generation units, each unit comprising a fuel cell stack and the fuel cell stacks being physically separate from each other; and
   an on-site computer located near the units and being coupled to the units to communicate indications of operating conditions of the units over a remote communication link to a remote computer, the on-site computer being adapted to execute a command to control the units.

2. The system of claim 1, wherein the on-site computer is adapted to log information indicative of operating parameters of the units.

3. The system of claim 2, wherein the information is stored in mass storage local to the on-site computer.

4. The system of claim 2, wherein the parameters comprise at least one of the following:
   a voltage, a current, a flow rate, an efficiency and a temperature.

5. The system of claim 1, wherein the operating conditions comprise:
   a power production state of at least one of the units.

6. The system of claim 1, wherein the operating conditions comprise:
   an output power of at least one of the units.

7. The system of claim 1, wherein the operating conditions comprise:
   an error status of at least one of the units.

8. The system of claim 1, wherein the remote communication link comprises, a satellite link.

9. The system of claim 1, wherein the remote communication link comprises a wide area network link.

10. The system of claim 1, wherein the remote communication link comprises a wireless radio-based link.

11. The system of claim 1, wherein the remote communication link comprises an Ethernet link.

12. The system of claim 1, wherein the on-site computer is adapted to:
    in response to an error occurring in the operation of one of the units, capture a waveform associated with the error.

13. The system of claim 1, wherein the command changes a power state of at least one of the units.

14. The system of claim 1, wherein each of the units comprises a complete fuel cell system.

15. The system of claim 1, wherein the command comprises a command originating at the remote computer.

16. A method comprising:
    providing fuel cell-based power generation units, each unit comprising a fuel cell stack and the fuel cell stacks being physically separate from each other;
    coupling an on-site computer to the units, the on-site computer being located near the units;
    communicating operating conditions of the units over a remote communication link to a remote computer; and
    executing a command at the on-site computer to control the fuel cell units, the command being communicated by the remote computer to the on-site computer.

17. The method of claim 16, further comprising:
    using the on-site computer to log information indicative of operating parameters of the units.

18. The method of claim 17, further comprising:
    storing the information in mass storage local to the on-site computer.

19. The method of claim 17, wherein the parameters comprise at least one of the following:
    a voltage, a current, a flow rate, an efficiency and a temperature.

20. The method of claim 16, wherein the operating conditions comprise:
    a power production state of at least one of the units.

21. The method of claim 16, wherein the operating conditions comprise:
    an output power of at least one of the units.

22. The method of claim 16, wherein the operating conditions comprise:
    an error status of at least one of the units.

23. The method of claim 16, wherein the remote communication link comprises a satellite link.

24. The method of claim 16, wherein the remote communication link comprises a wide area network link.

25. The method of claim 16, wherein the remote communication link comprises a radio link.

26. The method of claim 16, wherein the remote communication link comprises an Ethernet link.

27. The method of claim 16, further comprising:
in response to an error occurring in the operation of one of the fuel cell units, capturing a waveform associated with the error.

28. The method of claim 16 further comprising:
changing a power state of at least one of the fuel cell units in response to the execution of the command.

29. The method of claim 16, wherein each of the units comprises a complete fuel cell system.

* * * * *

UNITED STATES PATENT AND TRADEMARK OFFICE
CERTIFICATE OF CORRECTION

| | | |
|---|---|---|
| PATENT NO. | : 7,222,001 B2 | Page 1 of 1 |
| APPLICATION NO. | : 10/145828 | |
| DATED | : May 22, 2007 | |
| INVENTOR(S) | : Gordon Scott Frost et al. | |

It is certified that error appears in the above-identified patent and that said Letters Patent is hereby corrected as shown below:

Column 9:
Lines 1 and 2, "conimunication" should be --communication--.

Signed and Sealed this

Twenty-fourth Day of July, 2007

JON W. DUDAS
*Director of the United States Patent and Trademark Office*